April 15, 1958     W. N. JONES     2,830,453
TEMPERATURE MEASURING SYSTEM

Filed Aug. 24, 1953     3 Sheets-Sheet 2

INVENTOR.
WESLEY N. JONES
BY
*George H. Fisher*
ATTORNEY

April 15, 1958  W. N. JONES  2,830,453
TEMPERATURE MEASURING SYSTEM
Filed Aug. 24, 1953  3 Sheets-Sheet 3
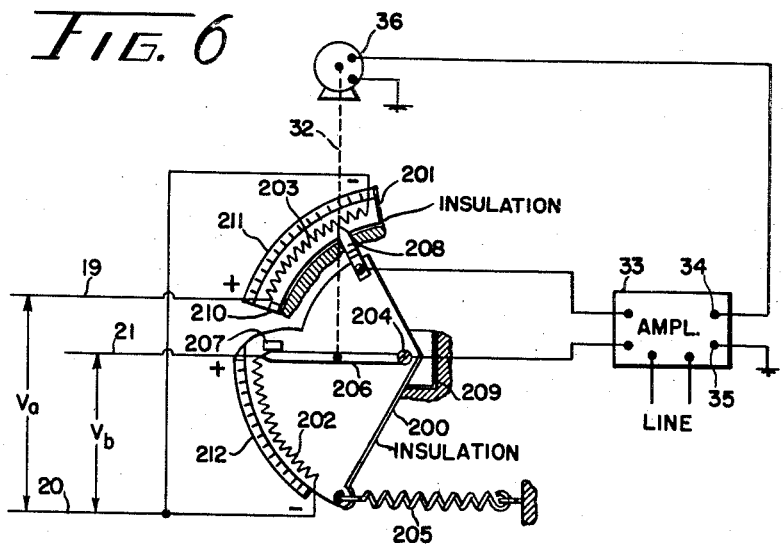
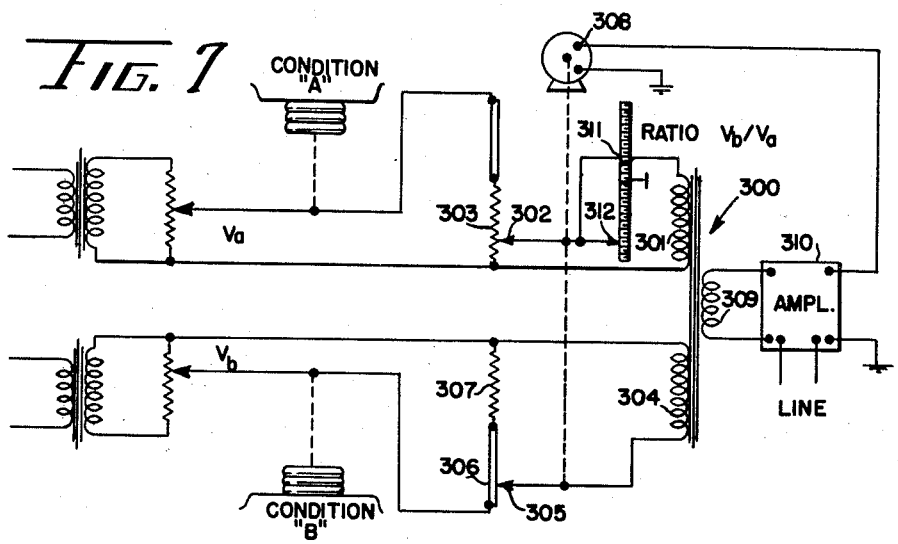
INVENTOR.
WESLEY N. JONES
BY George H Fisher
ATTORNEY

United States Patent Office 2,830,453
Patented Apr. 15, 1958

2,830,453

TEMPERATURE MEASURING SYSTEM

Wesley N. Jones, Minneapolis, Minn., assignor to Minneapolis-Honeywell Regulator Company, Minneapolis, Minn., a corporation of Delaware Application August 24, 1953, Serial No. 376,146

18 Claims. (Cl. 73—360)

The present invention is concerned with a new and improved indicating system for use with a plurality of variable voltage sources for measuring the ratio of the voltage outputs of the sources, which ratio may vary above and below a value of unity.

More particularly the present invention is concerned with an indicating system for measuring the ratio of two variable voltages employing a unique potentiometer and follow up system which renders the system capable of indicating the above mentioned ratio even though the ratio may vary above and below a value of unity.

Various systems have been devised in the prior art to measure the ratio of two voltages by means of a follow-up system, however these systems have been incapable of working within a range which included the ratio value of unity. This necessarily restricted the prior art devices to a range either above or below the value of unity and it was not possible without physically changing the electrical connections of the system to measure the ratio both above and below a value of unity.

It is therefore an object of the present invention to provide an indicating system which will indicate the ratio of two variable voltages irrespective of the manner in which the ratio varies.

It is a further object of the present invention to provide an indicating system capable of measuring the ratio of two variable voltages and employing a tapped potentiometer having a dead spot at each end of the potentiometer impedance element with a pair of ganged potentiometer wipers mechanically spaced so that when one of the wipers contacts the impedance element on one side of the tap the other wiper contacts the dead spot connected on the other side of the tap with the potentiometers connected to the voltage sources such that the voltage present across the wipers is the full voltage of one of the sources in opposition to a fractional part of the voltage of the other source.

It is a further object of the present invention to provide an indicating system capable of measuring the ratio of two variable voltages and employing a first potentiometer having a resistance element mounted on a movable plate and having a wiper movable across the resistance element until a stop is engaged whereupon further movement of the wiper causes the plate to move, and having a second potentiometer with a resistance element mounted on a fixed plate and having a wiper mounted to move as the plate of the first potentiometer moves.

It is a further object of the present invention to provide a temperature indicating system making use of two thermocouples of dissimilar characteristics to sense a single temperature to provide a first and second voltage source which voltage sources are connected to a potentiometer circuit having a pair of wipers controlled by a follow-up system such that the position of the wipers is an indication of the ratio of the outputs of the two thermocouples and therefore an indication of the temperature of the space to be measured, which ratio may vary above or below a value of unity.

These and other objects of the invention will become apparent after reading the attached specification in connection with the associated drawings wherein:

Figure 6 is a showing of a modified form of potentiometer; and

Figure 7 is a circuit diagram of still another modification of the present invention.

Figure 1:
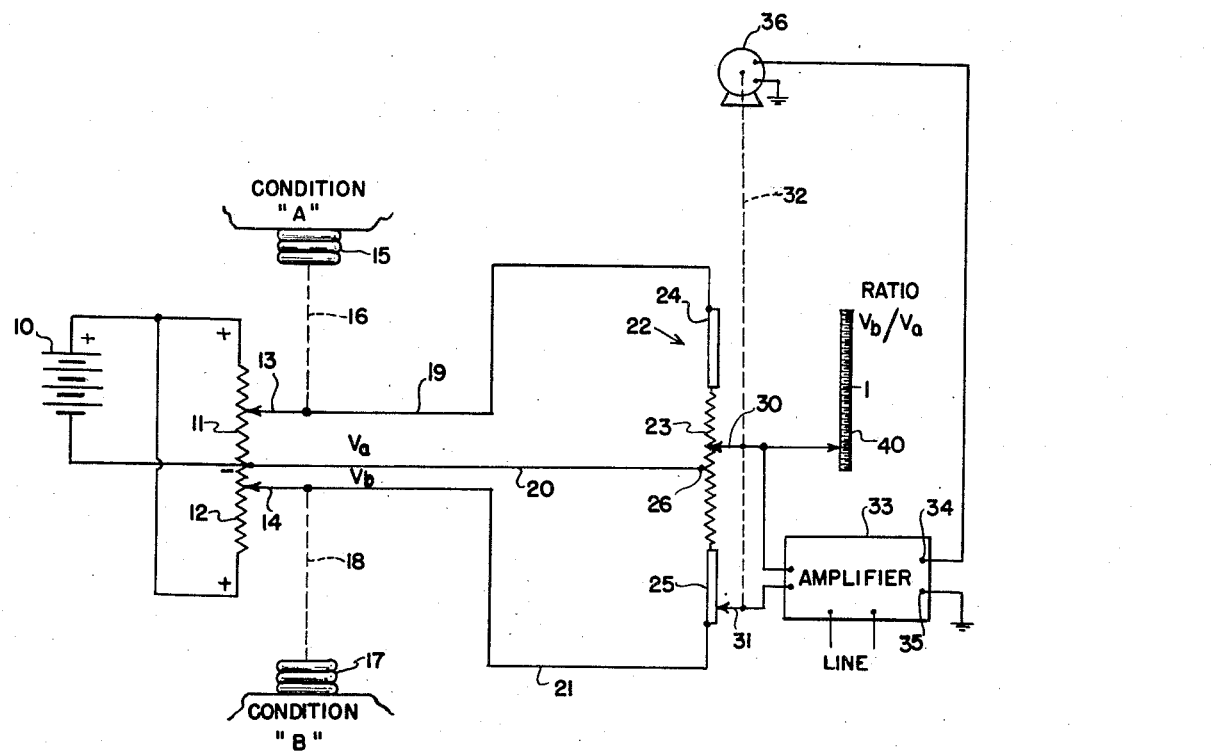
Figure 1 is a circuit diagram of one embodiment of the invention.

Referring specifically to Figure 1, the improved indicating system is shown as it is used to measure the ratio of a first variable voltage B to a second variable voltage A. In Figure 1 a direct current voltage source 10 is provided and is connected to a pair of potentiometers 11 and 12 having movable wipers 13 and 14, which wipers are moved independently in accordance with conditions A and B respectively. A bellows 15 is provided to sense the condition A and bellows 15 is connected by means of a mechanical connection, broken line 16, to wiper 13. A bellows 17 is provided to sense the condition B and bellows 17 is connected by means of a mechanical connection, broken line 18, to wiper 14. Conductors 19, 20, and 21 are connected to the wiper 13, the common connection of potentiometers 11 and 12, and the wiper 14, respectively.

The voltage present between conductors 20 and 19 is therefore a voltage indicative of the condition A while the voltage present between conductors 20 and 21 is a voltage indicative of the condition B.

Conductors 19, 20, and 21 are connected to a potentiometer 22. This potentiometer 22 includes a center-tapped impedance element 23 and a pair of low impedance conductor bars or dead spots 24 and 25 connected one to each end of the impedance element 23. The physical structure of this potentiometer 22 is such that the distances from center-tap 26 to either of the conductors 19 or 21 are equal and each distance is equally divided, one half of the distance being half of the length of impedance element 23 and the other half of the distance being the length of low impedance conductors 24 or 25. The potentiometer 22 also includes a pair of potentiometer wipers 30 and 31. The wipers 30 and 31 are mechanically connected as shown by the broken line 32 and are thereby adapted to move as a unit. The spacing of these wipers is such that one wiper or the other will always contact the impedance element 23 and the other wiper will always engage one of the shorting bars 24 or 25.

The wipers 30 and 31 are electrically connected to amplifying means 33. For example, this amplifying means may be an amplifier of the type which is sensitive to a first or a second polarity of input voltage to supply power to output terminals 34 and 35 in accordance with the polarity of the signals applied to the input of the amplifier. The output of the amplifier is fed to a motor 36 which has its shaft connected to a mechanical connection 32 connecting the ganged potentiometer wipers 30 and 31.

Consider now the operation of Figure 1; it can be seen that the voltage present across potentiometers 11 and 12 will be equal and will be equal to the voltage of the direct current source 10. The voltage $V_a$ and the voltage $V_b$ will be a function of the condition A and condition B respectively and the magnitude of this voltage will depend upon the magnitude of these conditions to which the bellows 15 and 17 are subjected. The voltage $V_a$ is connected directly from low impedance conductor bar 24 to tap 26 of potentiometer 22 and it can be seen that bar 24 will be positive with respect to tap 26. The voltage $V_b$ is connected between the tap 26 and the conductor bar 25 and it can be seen that tap 26 in this case will also be negative and bar 25 will be positive.

The input voltage to the amplifier 33 can be determined by tracing the amplifier input circuit from amplifier 33 through wiper 31, conductor bar 25, the lower half of impedance element 23, tap 26, a portion of the upper half of impedance element 23, and wiper 30 back to amplifier 33. In tracing the circuit in this direction the voltage $V_b$, which is a voltage drop, is connected in opposition to a portion of the voltage $V_a$, which voltage appears as a voltage rise.

In equation form this can be expressed as $$\text{input voltage} = -V_b + kV_a \tag{1}$$

where $k$ can be defined as the ratio $$k = \frac{\text{impedance from tap 26 to wiper 30}}{\text{one-half the impedance of element 23}} \tag{2}$$

from which it can be seen that $k$ is a function of the position of wiper 30.

If the system is in balance, that is if the portion of the voltage $V_a$ which is tapped off by wiper 30 is equal to the voltage $V_b$, substantially zero signal is fed to the input of the amplifier 33 and a scale 70 provides an indication of the ratio $V_b$ to $V_a$, this indication being provided by pointer 40 mechanically connected to wiper 30.

In equation form this can be shown by equating Equation 1 to zero $$0 = -V_b + kV_a$$

or $$k = V_b / V_a \tag{3}$$

Therefore with the system in balance Equations 2 and 3 can be combined to show that the position of wiper 30 is indicative of the ratio $V_b / V_a$.

Assume for the moment that there is now a change in condition A and wiper 13 of potentiometer 11 moves in an upward direction. The net effect of this is to increase the voltage $V_a$ and thereby increase the voltage present across the potentiometer 22 from tap 26 to wiper 30. The net effect so far as the amplifier 33 is concerned is to apply a signal voltage to the input of the amplifier. Considering again the circuit which is traced to determine the voltage present on the input of the amplifier, it can be seen that the assumed change in condition A will produce a net voltage rise which will appear at the input of the amplifier 33. The amplifier is thereby effected to feed a signal to the motor 36 and the motor 36 through the mechanical connection 32 adjusts the ganged potentiometers 30 and 31.

The direction of movement of the ganged potentiometers 30 and 31 is in a direction to substantially reduce the input voltage to the amplifier to zero. This is accomplished by moving the wipers in a downward direction. This downward movement of the wipers has no effect upon the voltage present from wiper 31 to center tap 26 but this movement does reduce the voltage present from center tap 26 to wiper 30. This downward movement of wipers 30 and 31 continues until a new balance point is reached. At this point the input voltage to the amplifier 33 is reduced substantially to zero. The movement of ganged potentiometer wipers 30 and 31 also causes movement of the pointer 40 in a downward direction and by the use of the scale 40 the new ratio $V_b$ to $V_a$ can be obtained.

Assume now that the condition A again changes, however in this case the change is such that the potentiometer wiper 13 moves in a downward direction. This reduces the voltage $V_a$ and if such a condition continues a point will be reached where $V_a$ is equal to $V_b$. As this condition is approached the voltage present from tap 26 to wiper 30 becomes increasingly smaller and in order to maintain the input voltage of the amplifier 33 at substantially zero the amplifier is effective to control the motor 36 to move the ganged potentiometers in an upward direction.

It can be readily seen that so long as the wiper 31 remains engaged with the conductor bar 25 the only effect this movement has upon the input circuit to the amplifier is to increase the voltage from tap 26 to wiper 30. When the point is reached where $V_a$ is equal to $V_b$ the ganged potentiometers have moved so that wiper 30 is at the junction of impedance element 23 and conductor bar 24 and wiper 31 is at the junction of conductor bar 25 and the lower half of impedance element 23. In this condition the pointer 40 indicates that the ratio of $V_b$ to $V_a$ is equal to 1. This is the median position of the wipers 30 and 31. In this position, the voltage between wipers 30 and 31 is the maximum or full value of $V_a$ in opposition to the maximum or full value of $V_b$. On either side of this position, the voltage between wipers 30 and 31 is the maximum of one and a portion of the other voltage.

Should the trend continue, namely that condition A causes wiper 13 to continue to move in the downward direction, the voltage $V_b$ will become greater than voltage $V_a$ and the ratio of $V_b$ to $V_a$ will become greater than one. This is sensed by the amplifier 33 and motor 36 continues to move the ganged potentiometer wipers 30 and 31 in an upward direction.

However, the movement of the potentiometer wipers now causes the voltage present from wiper 31 to tap 26 to decrease and since $V_b$ is now greater thtan $V_a$ such movement is utilized to reduce the input voltage of the amplifier substantially to zero. The pointer 40 now indicates that the ratio $V_b$ to $V_a$ is greater than 1.

When $V_a$ equals $V_b$ the quantity $k$ is equal to one and if $V_b$ becomes greater than $V_a$, $k$ must be considered as $$k = \frac{\text{one-half the impedance of element 23}}{\text{impedance from tap 26 to wiper 21}} \tag{4}$$

If the system is considered to be in balance with $V_b$ greater than $V_a$, the combination of Equations 3 and 4 shows that the position of wiper 31 is indicative of the ratio $V_b / V_a$. However, since wipers 30 and 31 are mechanically ganged it can also be said that the position of wiper 30 is indicative of the ratio $V_b / V_a$, as was the case explained above when $V_a$ is greater than $V_b$.

While the explanation of the operation of Figure 1 has been made referring only to changing the condition A it will be readily recognized that the conditions A and B can vary independent of each other and that the improved indication system will at all times indicate the ratio of $V_b$ to $V_a$ which is in reality an indication of the ratio of condition B to condition A.

Figure 2:
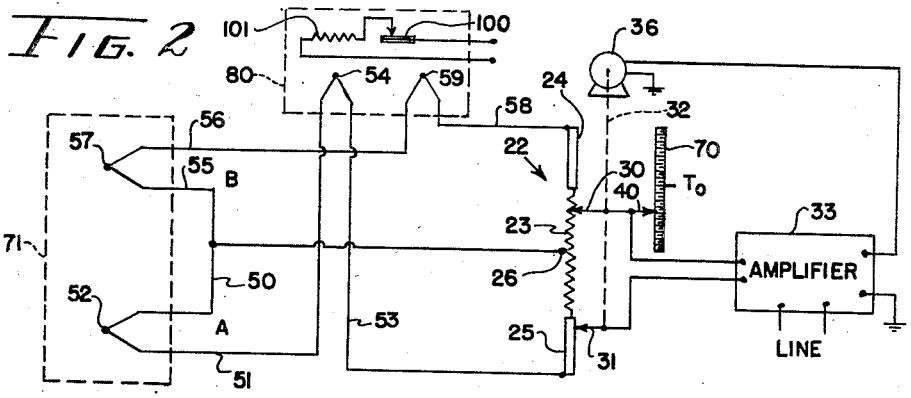
Figure 2 is a circuit diagram of another embodiment of the invention wherein the indicating system is shown in conjunction with a pair of dissimilar thermocouples to measure the temperature of a confined space.

Species of Figure 2

Referring now to Figure 2, the improved indicating system is shown in conjunction with a temperature indicating device making use of the dual thermocouple principle disclosed in the co-pending Edward C. Petry application Serial No. 198,263, filed November 30, 1950, in which application a thermocouple temperature indicating system is disclosed wherein a standard source of voltage is not necessary. The temperature indicating device disclosed in the above mentioned co-pending application is of the type which is limited in its operating range to that particular range in which the ratio of the output voltages of the two thermocouples does not pass over the unity value.

In Figure 2, a thermocouple A is shown having a first conductor 50 and a second conductor 51 joined at 52 to form a temperature sensing junction. A conductor 53, which is of the same material as conductor 50, is joined with conductor 51 at 54 to form the reference junction of thermocouple A. In thermocouple A conductor 51 is thermoelectrically positive with respect to conductor 50.

A thermocouple B is also provided having a first conductor 55 and a second conductor 56 joined at 57 to form a temperature sensing junction. A conductor 58, which is of the same material as the conductor 55, is joined with conductor 56 at 59 to form the reference junction for thermocouple B. In thermocouple B conductor 56 is thermoelectrically positive with respect to conductor 55.

Figure 3:
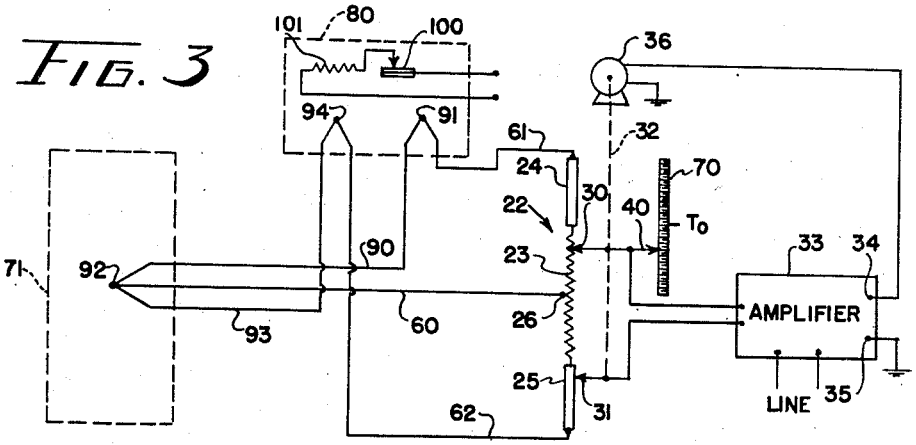
Figure 3 is a circuit diagram of still another embodiment of the invention, this embodiment being similar to that of Figure 2 wherein the two thermocouples have a single lead in common.

It is well to point out at this time that the modification disclosed in Figure 3 is simply a so-called three wire system for a dual thermocouple network similar to that of Figure 2 but in which the conductors 50 and 55 of Figure 2 appear as a single conductor 60 and conductors 61 and 62 are of the same material as conductor 60. Conductor 90 is joined at 91 with conductor 61 to form a reference junction and is joined at 92 with conductor 60 to form a temperature sensing junction of one thermocouple. Conductor 93 is joined at 94 with conductor 62 to form a reference junction and is joined at 92 with conductor 60 to form a temperature sensing junction of a second thermocouple.

In both Figures 2 and 3 potentiometer 22 is provided and has identical mechanical characteristics to that described with regard to Figure 1. Since this is true, the potentiometers of Figures 2 and 3 are given the same reference numerals as corresponding members in Figure 1.

Amplifier 33 disclosed in Figures 2 and 3 is identical to amplifier 33 of the modification of Figure 1 and controls a motor 36 in the same manner as explained in connection wtih Figure 1. This motor 36 is likewise connected to the ganged potentiometer wipers 30 and 31 by means of a mechanical connection 32. A pointer 40 is again provided in Figures 2 and 3 and cooperates with a calibrated scale 70 which is calibrated to indicate the temperature of confined space 71 to which the thermocouple temperature sensing junctions are subjected. The reference junctions are maintained at a constant temperature $T_R$ by means of a temperature controlled chamber 80, shown in Figures 2 and 3. A bimetal switching assembly 100 and a heater 101 are provided to supply heat energy to the chamber 80 whenever the switching assembly 100 indicates such a need. The heater and the switching assembly are connected to a source of power not shown.

Figure 4:
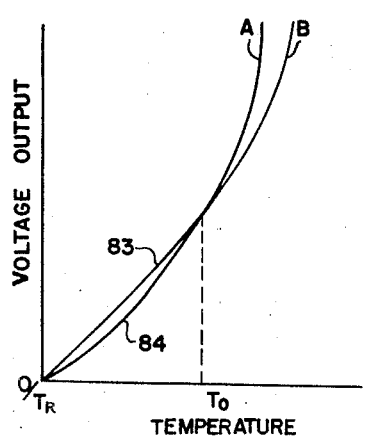
Figure 4 is a diagram showing the voltage output versus tempertaure characteristic curves of two theoretical thermocouples A and B.

So long as thermocouples A and B have dissimilar characteristics such as shown in Figure 4 the ratio of the output voltage of one thermocouple to that of the other thermocouple can be used to indicate the common temperature to which the temperature sensing junctions of the thermocouples are subjected.

The output voltage of a thermocouple can be expressed as $$V = at + bt^2 \quad (5)$$

where $a$ and $b$ are constants of the particular thermocouple being considered and $t$ is the temperature differential between the temperature sensing junction and the reference junction of the thermocouple.

The ratio of the output voltage of thermocouple B to thermocouple A, with the temperature sensing junctions of thermocouples A and B at a first temperature and the reference junctions at a second temperature, can be expressed as $$r = \frac{V_a}{V_b} = \frac{at + bt^2}{ct + dt^2} \quad (6)$$

Figure 5:
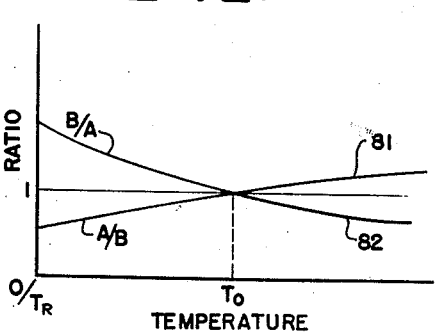
Figure 5 is a plot of the ratio of the output voltages of the thermocouples of Figure 4, showing the two possible ratios namely the ratio of A to B and the ratio of B to A.

This ratio is plotted in Figure 5 for thermocouples A and B of Figure 4.

Consider now the input voltage to amplifier 33, $$\text{input voltage} = -V_a + kV_b \quad (7)$$

where $k$ is defined in Equation 2 above.

Considering now that the system is balanced, Equation 7 can be set equal to zero, which results in the equation $$k = V_a / V_b$$

Therefore $k$, which is a function of the position of wiper 30, is also equal to $r$, the ratio plotted in Figure 5. The value of $k$, with the system in balance, can therefore be used in conjunction with the curves of Figure 5 to obtain the temperature of confined space 71 or to calibrate the scale 70 to read the temperature directly.

If it is assumed that the apparatus of Figure 2 is in an equilibrium position it can be seen that the temperature of the chamber 71 is of necessity below the value $T_0$ as shown on Figure 4. This is true since the characteristics of the thermocouples A and B are such that when they are subjected to a temperature below $T_0$ the output voltage of thermocouple B, as shown by curve 83, is greater than the output voltage of the thermocouple A, shown by curve 84. Therefore, the entire output voltage of thermocouple A is connected in opposition to a portion of the output voltage of thermocouple B. This can be seen by tracing the input circuit of the amplifier 33 from the potentiometer wiper 31 through conductor bar 35, the lower half of impedance element 23, center tap 26, a portion of the upper half of impedance element 23 to wiper 30 and back to amplifier 33.

If it is assumed that the temperature of the confined space 71 now increases, it can be seen that the output voltage of both thermocouple A and thermocouple B will also increase; however, until the temperature $T_0$ is reached the output of thermocouple B will always be greater than the output of thermocouple A and the amplifier 33 will sense the resulting input signal to cause the motor 36 to position the ganged potentiometers 30 and 31 such that a greater portion of the output voltage of thermocouple B is present in the input circuit of amplifier 33 to oppose the entire voltage of thermocouple A present in this input circuit.

If this trend continues, namely that the temperature of the confined space 71 increases, the point will be reached where the temperature of the confined space 71 is equal to the temperature $T_0$ shown in Figure 4. At this point the output of the thermocouple B is equal to the output of thermocouple A. In order for the input voltage of amplifier 33 to be substantially zero the motor 36 adjusts the ganged potentiometers 30 and 31 until the potentiometer 30 is at the junction of the upper half of impedance element 23 and conductor bar 24 and the potentiometer wiper 31 is at the junction of the lower half of impedance element 23 and conductor bar 25. The pointer 40 now indicates that the temperature of the confined space 71 is equal to $T_0$.

Assume now that the temperature of the space 71 continues to increase so that the temperature of space 71 is above a value of $T_0$. Referring to Figure 4 it can be seen that the output voltage of thermocouple A is now greater than the output voltage of thermocouple B and in order for the input voltage to the amplifier 33 to remain substantially zero the control motor 36 continues to move the ganged wipers 30 and 31 in an upward direction. It will now be seen that continued movement of the wipers in the upward direction has no effect on the output voltage of thermocouple B which is present in the input circuit of amplifier 33 but such movement does govern the portion of the output voltage of thermocouple A which is present in this circuit. In this manner continued adjustment in the upward direction causes the input voltage to the amplifier 33 to remain at substantially zero as the temperature of space 71 becomes greater than $T_0$.

It can be seen that the present invention provides a system whereby a temperature indicating device of the broad type disclosed in the above mentioned Petry copending application can be adapted for temperature indication where the output voltage of the particular thermocouples used intersects and the ratio of the output voltages varies above and below a value of unity. It will be immediately recognized that this is a very important feature since it greatly extends the range of the invention disclosed in the above mentioned Petry application.

Species of Figure 6

Referring now to Figure 6, a modified form of potentiometer is shown. In the apparatus of Figure 6 the conductors 19, 20, and 21 are identical to and are given the same reference numerals as in Figure 1 since these conductors can be visualized as being connected as in Figure 1 to potentiometers 11 and 12. Also, amplifier means 33, motor 36 and mechanical connection 32 bear the same reference numerals as in Figure 1.

The potentiometer means of Figure 6 includes a pair of insulating plates 200 and 201 upon which are mounted potentiometer resistance elements 202 and 203 respectively. Plate 201 is fixed, while plate 200 is pivoted at 204 to a stationary plate 209 and is biased for counterclockwise rotation by means of spring 205.

Cooperating with element 202 is a wiper 206. Wiper 206 is pivoted at 204 and is free to move about the pivot with respect to plate 200. However, clockwise rotation of wiper 206 with respect to plate 200 is restricted by a stop 207 which is fixed to plate 200. After wiper 206 engages stop 207, further clockwise rotation of the wiper causes plate 200 to rotate clockwise about its pivot against the bias of spring 205. Subsequent counterclockwise rotation of wiper 206 does not cause the position of the wiper with respect to resistance element 202 to be varied until plate 200 has been rotated to the position where spring 205 no longer exerts a force on the plate. A stop 210 mounted on plate 201 may be provided to restrict counterclockwise rotation of plate 200, as will be described. Further counterclockwise rotation of wiper 206 causes this wiper to move with respect to element 202.

Cooperating with element 203 is a wiper 208 which is moved as plate 200 moves. For example, wiper 208 may be rigidly fixed to plate 200 and movable therewith. Wiper 208 has an offset part which engages resistance element 203, plate 201 lying in a plane below the plane of plate 200 so that plate 200 can move over plate 201. As before mentioned, when wiper 206 moves in a clockwise direction to the point where stop 207 is engaged, further clockwise rotation of wiper 206 causes plate 200 to rotate clockwise. This causes wiper 208 to move clockwise along resistance element 203. Also, subsequent counterclockwise rotation of wiper 206 causes plate 200 and therefore wiper 208 to rotate counterclockwise until the force exerted by spring 205 is reduced to zero or until wiper 208 engages stop 210 to prevent further movement of plate 200. At this time wiper 208 is at the lower end of element 203.

The showing of Figure 6 is identical to that of Figure 1 in so far as all of the whole of the voltage $V_b$ is connected in circuit to the input of amplifier 30 in opposition to a portion of the voltage $V_a$. As with Figure 1, this is for the case where $V_a$ is greater than $V_b$. If it is assumed that $V_b$ is now greater than $V_a$, motor 36 will exert a force on wiper 206 and cause the wiper to rotate counterclockwise until spring 205 no longer exerts a force on plate 200 or until wiper 208 engages stop 210. At this instant all of the voltage $V_a$ is in series opposition to all of the voltage $V_b$ in the input of amplifier 33. This is the median position of the apparatus. Further counterclockwise rotation causes wiper 206 to move along resistance element 202.

This reduces the amount of the voltage $V_b$ that is connected to the input of amplifier 33 and this motion continues until the portion of $V_b$ connected in the input of the amplifier is made equal to the whole of $V_a$.

As can be seen from the above description, when $V_a$ is greater than $V_b$ the wiper 208 moves along element 203 until a balance point is found. Therefore a scale 211 is attached to plate 201 and is provided to indicate the ratio $V_b/V_a$. When $V_b$ is greater than $V_a$ the wiper 206 moves along element 202 until a balance point is found. Therefore a scale 212 is attached to plate 200 to be movable therewith and is provided to indicate the ratio $V_b/V_a$. Scale 211 indicates ratio values less than 1 and scale 212 indicates ratio values greater than 1.

Species of Figure 7

The apparatus of Figure 7 is a method for eliminating the common point of the two voltage sources, for example, conductor 20 of Figure 1. In some cases it may be desirable to eliminate a direct electrical connection between variable alternating voltage sources such as $V_a$ and $V_b$. In this case a magnetic amplifier or a transformer may be provided. In Figure 7 a transformer 300 is shown having a first primary winding 301 connected from a wiper 302 to one end of a potentiometer resistance element 303. A second primary winding 304, identical to winding 301, is connected to a wiper 305 which cooperates with a shorting bar 306 and is connected to one end of a potentiometer resistance element 307. Wipers 302 and 305 are mechanically coupled and are coupled to a motor 308, rotation of the motor causing movement of the wires 302 and 305 as a unit.

Transformer 300 is provided with a secondary winding 309, which winding is connected to the input of amplifier 310. Amplifier 310 is similar to the amplifier 33 above described with the exception that amplifier 310 is sensitive to a first or a second phase of input voltage. The phasing of windings 301 and 304 is such that the voltages induced in winding 309 are 180 degrees out of phase and at balance no voltage is induced in winding 309.

The operation of the apparatus of Figure 7 is similar to that of Figures 1 and 6 in that an unbalance in the system is sensed by the amplifier 310 to cause the motor 308 to position wipers 302 and 305 until the input to amplifier 310 is reduced to substantially zero. The ratio of $V_b$ to $V_a$ is then shown on scale 311 which cooperates with pointer 312.

While a potentiometer such as shown in Figure 1 is also shown in the modification of Figure 7, it is recognized that the potentiometer of Figure 6 can also be used in the modification of Figure 7.

While the showings of Figures 1, 2, 3, 6 and 7 have been restricted to particular manners in which this novel indicating system can be used it will be readily apparent to those skilled in the art that this system has a very wide range of application in various systems in which the problem of correlating any two functions which may vary such that the ratio may be greater or less than unity is present.

Having thus explained my invention, I claim:

1. An indicating system comprising: a first and a second voltage source having variable outputs; a potentiometer having a tapped resistance element, a pair of low impedance conductors connected to each end of said resistance element, and a pair of wipers arranged to be moved as a unit such that when either wiper contacts said resistance element on one side of said tap the other wiper contacts the low impedance conductor connected to said resistance element on the other side of said tap; means connecting said first voltage source to said tap and to one of said conductors, means connecting said second voltage source to said tap and to the other of said conductor bars in a manner so that the ouput voltages of said first and second source are in opposition across said resistance element; and voltage responsive means connected to said pair of wipers to be controlled by the voltages thereon and including means to move said wipers in accordance with the voltage present upon said wipers to reduce the voltage on said wipers substantially to zero.

2. An indicating system comprising: a first and a second variable source of voltage; a potentiometer having a tapped resistance element, a pair of low impedance conductor bars connected one to each end of said resistance element, and a pair of wiper arms mechanically interconnected to move as a unit and spaced so that when either of said wipers contacts said resistance element on one side of said tap the other of said wipers contacts the conductor bar connected to the end of said resistance element on the other side of said tap; circuit means connecting said first and second source of voltage to said potentiometer so that the output of one of said sources is applied across one end and the tap of said potentiometer and the ouput of the other source is applied across the other end and the tap of said potentiometer and the output voltages of said sources are in opposition across said resistance element; voltage responsive means connected to said wipers and controlled by the voltage thereon and having power means to position said wipers in accordance with the voltage present across said wipers to reduce the voltage across said wipers substantially to zero.

3. An indicating system comprising: a first and a second source of variable voltage, said sources each having a first output lead of one polarity and a second output lead of the opposite polarity; a potentiometer having a center tapped impedance element and a pair of conductor bars connected one to each end of said impedance element, a pair of ganged potentiometer wipers having a mechanical spacing equal to the length of said impedance element so that when either of said wipers contacts said impedance element on one side of said center tap the other of said wipers contacts the conductor bar connected to the end of said impedance element on the other side of said center tap; circuit means connecting said first output lead of said first source to one of said conductor bars and said first output lead of said second source to the other of said conductor bars, further circuit means connecting said second output lead of each of said sources to said center tap, the voltage between said wipers thereby being the entire voltage of one of said sources in opposition to a portion of the voltage of the other of said sources; and voltage responsive means connected to said wipers including means to position said wipers in accordance with said voltage between said wipers to reduce said voltage substantially to zero.

4. An indicating system comprising: a first and a second voltage source having variable output voltages and having output leads of one polarity and of the opposite polarity; a potentiometer having a tapped relatively high impedance resistance element, a first and a second low impedance conductor bar connected one to each end of said resistance element, and a pair of ganged wipers mechanically connected so that when either of said wipers engages said resistance element on one side of its tap the other of said wipers engages the conductor bar on the other side of the tap; circuit means connecting the output leads of said first and second sources to said potentiometer so that the leads of said one polarity are connected to said tap and the leads of said opposite polarity are connected one to said first conductor bar and one to said second conductor bar; means including voltage responsive means connected to said wipers so that voltage present across said wipers is impressed upon said voltage responsive means, and drive means mechanically connected to said wiper and controlled by said voltage responsive means, said drive means positioning said wipers to reduce the voltage present across said wipers substantially to zero, the position of said wipers being indicative of the ratio of the output voltages of said first and second source, which ratio may vary above and below a value of unity.

5. An indicating system comprising: a first variable voltage source responsive to a first condition, a second variable voltage source responsive to a second condition; a potentiometer having a center tapped resistance element and a pair of conductor bars connected one to each end of said resistance element, a pair of potentiometer wipers mechanically coupled to move as a unit and spaced so that when either of said wipers contacts said resistance element on one side of said center tap the other of said wipers contacts the conductor bar connected to said resistance element on the other side of said center tap; circuit means connecting the output of said first source from said center tap to one of said conductor bars and connecting the ouput of said second source from said center tap to the other of said conductor bars such that the outputs of said first and second sources are in bucking relationship across said resistance element; and voltage responsive means connected to said wipers and subject to the signal voltage across said wipers to control a motor arranged to position said wipers to reduce said signal voltage substantially to zero, the position of said wipers being indicative of the ratio of the output of one source to the other, which ratio may vary above or below a value of unity.

6. A temperature indicating system comprising: a first and a second voltage source having output voltage versus temperature characteristics which differ, each of said sources having a temperature sensing element and a pair of output conductors, said temperature sensing elements being subjected to a common temperature to be indicated; a potentiometer having a fixed center tap, a pair of movable taps and conductor elements connected to the ends of said potentiometer, said movable taps being mechanically interconnected so that when either of said movable taps is positioned along said potentiometer the other of said movable taps is positioned along one of said conductor elements; means connecting one of said pair of output conductors of said first source to a first of said conductor elements, one of said pair of output conductors of said second source to the second of said conductor elements, and the other of said pair of output conductors of said first and second sources to the fixed tap of said potentiometer in a manner so that the output voltages of said first and second sources are in opposition; a voltage responsive means having an input and effective to vary the position of the variable taps of said potentiometer in accordance with the signal voltage applied to said input; and means connecting the variable taps of said potentiometer to the input of said voltage responsive means, said voltage responsive means being effective to move said variable taps to reduce the voltage present across said taps substantially to zero.

7. A temperature indicating system comprising: a first thermoelectric source of voltage, a second thermoelectric source of voltage, said first and second sources having temperature sensing junctions subjected to a common temperature to be indicated and having different output voltage versus temperature characteristics; a potentiometer having a resistance element, a fixed tap connected to said resistance element, a pair of conductor elements connected one to each end of said resistance element, and a pair of ganged variable taps, said variable taps being ganged so that when either of said variable taps is positioned on said resistance element the other of said variable taps is positioned on one of said conductor elements; means connecting said first and second voltage sources to said fixed tap and to said conductor elements so that the output voltage of said first source is applied from said fixed tap to one of said conductor elements and the output voltage of said second source is applied in opposition to said first source from said fixed tap to the other of said conductor elements; a voltage responsive means having an input and effective to move said ganged variable taps in accordance with the input voltage of said responsive means, and means connecting said variable taps to the input of said voltage responsive means, said voltage responsive means being effective to cause adjustment of said variable taps until the input voltage to said voltage responsive means is substantially zero, the position of said variable taps with said input voltage substantially zero being indicative of said temperature to be indicated.

8. A temperature indicating apparatus comprising: a first and a second thermoelectric source of voltage, said first and second sources each having a temperature sensing junction subjected to a common temperature to be indicated and a reference junction subjected to a constant reference temperature, said first and second sources having output voltage versus temperature characteristics which differ; a potentiometer having a first and a second resistance element joined at a fixed tap, a first and a second conductor bar connected to the free end of said first and second resistance elements, and a pair of variable taps mechanically connected, said variable taps being movable jointly so that when either of said taps is positioned on said first or said second resistance element the other of said variable taps is positioned on said second or said first conductor bar; means connecting said first and second thermoelectric sources to said fixed tap and said first and second conductor bar so that the output voltage of said first source is applied across said first resistance element and the output voltage of said second source is connected across said second resistance element in opposition to said first source; voltage responsive means having an input and connected to adjust said variable taps in accordance with the voltage applied to said input, and means connecting said variable taps to the input of said voltage responsive means to thereby cause said variable taps to be adjusted until the voltage applied to said input is reduced substantially to zero, the position of said variable taps upon said input being reduced substantially to zero being indicative of the temperature of said sensing junction.

9. A temperature indicating system comprising: a first and a second source of voltage having output voltage versus temperature characteristics which differ and having temperature sensing elements located at a common temperature to be indicated; a potentiometer having a resistance element with a fixed tap, a pair of conductor bars connected to each end of said resistance element, and a pair of variable taps ganged for joint movement such that when either of said variable taps is positioned on said resistance element on one side of said fixed tap the other of said variable taps is positioned on the conductor bar connected to said resistance element on the other side of said fixed tap; means connecting said first and second sources to said fixed tap and to said pair of conductor bars to apply the output voltages of said sources to said potentiometer, said last named means connecting said sources to said potentiometer so that a first polarity of voltage is applied to said conductor bars and the opposite polarity from said first polarity is applied to said fixed tap; voltage responsive means having an input and effective to cause adjustment of said variable taps in accordance with the voltage applied to said input, and means connecting said variable taps to the input of said voltage responsive means to thereby cause said variable taps to be adjusted to reduce the input voltage of said voltage responsive means substantially to zero, the position of said variable taps being indicative of the temperature to be indicated.

10. A temperature indicating system comprising: a first and a second thermocouple having different output voltage versus temperature characteristics, said thermocouples each having a temperature sensing junction and a reference junction, said temperature sensing junction being subjected to a common temperature to be indicated and said reference junction being maintained at a constant reference temperature; a potentiometer having a center tapped resistance element, a pair of ganged variable taps arranged to be positioned one on each side of said center tap, and a pair of conductor bars connected one to each end of said resistance element, said variable taps cooperating so that when one or the other of said taps is positioned on the resistance element on one side of said center tap the remaining one of said variable taps is positioned on the conductor bar connected on the opposite side of said center tap; means connecting said first and second thermocouples to said center tap and said conductor bars so that a signal voltage exists between said variable taps which is a function of the difference between the voltage outputs of said first and second thermocouple; voltage responsive means having an input and drive means; means connecting said variable taps to said input to apply said signal voltage to said input, and means connecting said drive means to said variable taps thereby causing adjustment of said taps to a position where said signal voltage is reduced substantially to zero, said last named position being indicative of the temperature to be indicated.

11. A temperature indicating apparatus comprising: a first and a second thermocouple having output voltage versus temperature characteristics which differ, said characteristics having a first range in which the output voltage of said first thermocouple exceeds that of said second thermocouple and having a second range in which the output voltage of said second thermocouple exceeds that of said first thermocouple, said thermocouples being subjected to a common temperature to be indicated; a potentiometer having a center tapped resistance element, a pair of conductor bars connected one to each of said resistance element, and a pair of variable taps mechanically interconnected to be jointly moved and arranged to be positioned one on each side of said center tap and spaced such that when either of said taps is positioned on the resistance element on one side of said center tap the other of said taps is positioned on the conductor bar connected on the opposite side of said center tap; means connecting said first and second thermocouples to said center tap and said conductor bars to apply a voltage of a first polarity to said conductor bars and a voltage of the opposite polarity to said center tap to thereby apply a signal voltage across said variable taps which is a function of the difference in the output voltage of one of said thermocouples and a fractional part of the output voltage of the other of said thermocouples; voltage responsive means having an input and an output drive means, means connecting said variable taps to said input to apply said signal voltage to said input, and means connecting said drive means to said variable taps to position said taps to reduce said signal voltage substantially to zero, said variable taps being continuously moved in a given sense as the temperature to be indicated increases or decreases within said ranges, the transition point between said first and second ranges being accomplished by the movement of one of said taps off of the resistance element and on to the conductor bar on one side of said center tap and by the movement of the other of said taps off of the conductor bar and on to the resistance element on the opposite side of said center tap, the position of said variable taps when said control signal is substantially zero being indicative of the temperature to be indicated.

12. Control apparatus comprising: a first and a second variable source of voltage; a first potentiometer having a movable member, biasing means urging said movable member in a first direction, a first resistance element mounted on said movable member, a first movable wiper cooperating with said first resistance element, and means mounted on said movable member adapted to coact with said first wiper to restrict the movement of said first wiper after said wiper has moved a predetermined distance with respect to said movable member in a direction opposite said first direction; a second potentiometer having a fixed member, a second resistance element mounted on said fixed member, and a second movable wiper cooperating with said second resistance element; means mounted on said fixed member adapted to restrict movement of said movable member when said second wiper has moved a predetermined distance in said first direction with respect to said second resistance element; means for transmitting movement of said movable member to said second wiper; circuit means connecting said first resistance element to said first source of voltage and said second resistance element to said second source of voltage to thereby apply the output voltages of said first and second sources across said first and second resistance elements in a manner so that opposing voltages appear on said first and second wipers; an amplifier having an input, means connecting said input to said first and second wipers to apply the voltage thereon to said input; and drive means controlled by said amplifier and mechanically coupled to said first wiper to cause movement of said first wiper to reduce the voltage at said input substantially to zero.

13. Control apparatus comprising: a potentiometer having a movable base member, biasing means urging said base member in a predetermined direction, a first resistance element mounted on said base member, a first movable wiper engaging said resistance element, a stop member adapted to restrict movement of said first wiper and arranged relative to said movable base member so that said first wiper can move a predetermined distance with respect to said movable base member, with further movement of said first wiper causing said first wiper to remain stationary with respect to said first resistance element and causing movement of said movable base member against the action of said biasing means; a second potentiometer having a fixed base member, a second resistance element, and a second movable wiper engaging said second resistance element; means to transmit movement of said movable base member to said second wiper; means mounted on said fixed base member adapted to restrict movement of said movable base member when said second wiper has moved a predetermined distance with respect to said second resistance element in said predetermined direction; a first variable source of voltage connected to said first resistance element in a manner to cause a voltage of a first sense to exist on said first wiper, a second variable source of voltage connected to said second resistance element in a manner to cause a voltage of an opposite sense to exist on said second wiper; voltage responsive means connected to said first and second wiper, motor means controlled by said voltage responsive means, means connecting the output of said motor means to said first wiper so that said motor means adjusts said first wiper until the voltage between said first and second wiper is reduced substantially to zero.

14. Indicator apparatus for indicating the ratio for first and a second variable, comprising: a first potentiometer having a movable base member mounting a resistance element and a first movable wiper, means biasing said movable base member for movement in a first direction, means mounted on said movable base member to restrict the movement of said first wiper relative to said movable base member when said first wiper moves a predetermined distance in a direction opposite to said first direction so that further movement of said first wiper in said opposite direction causes said movable base member to move against its bias; a second potentiometer having a fixed base member mounting a resistance element, a second movable wiper for said second potentiometer, means to transmit motion of said movable base member to said second wiper; means mounted on said fixed base member adapted to restrict movement of said second wiper relative to said fixed base member when said second wiper moves a predetermined distance in said first direction; a first source of voltage variable in accordance with a first variable, circuit means connecting said first source to said resistance element of said first potentiometer to apply a voltage of a first sense to said first wiper, a second source of voltage variable in accordance with a second variable, circuit means connecting said second source to said resistance element of said second potentiometer to apply a voltage of an opposite sense to said second wiper; amplifier means having an input circuit connected to said first and second wipers to apply an input signal to said input circuit, motor means controlled by said amplifier in accordance with said input signal, means mechanically connecting said motor means to said first wiper to cause said first wiper to move in a direction to cause said input signal to be reduced to substantially zero, and scale means associated with said first and second potentiometers to indicate the ratio of said first and second variable.

15. In combination, a first source of voltage, a second source of voltage; a first voltage translating means having an input and an output and having moveable means constructed and arranged to control the amount of voltage which appears at the output, said first voltage translating means having a potential gradient dead spot wherein there is no relative potential gradient upon movement of said moveable means; a second voltage translating means having an input and an output and having moveable means constructed and arranged to control the amount of voltage which appears at the output, said second voltage translating means having a potential gradient dead spot wherein there is no relative potential gradient upon movement of said moveable means; circuit means connecting said first source of voltage to the input of said first voltage translating means in a manner to cause a voltage of a first sense to appear at the output of said first voltage translating means, circuit means connecting said second source of voltage to the input of said second voltage translating means in a manner to cause a voltage of a sense opposite to said first sense to appear at the output of said second voltage translating means; voltage responsive means, circuit means connecting the output of said first and second voltage translating means to said voltage responsive means; and mechanical means coupling the moveable means of said first and second voltage translating means relative to each other so that in a median position the voltage impressed on said voltage responsive means consists of the full voltage of said first source of voltage and the full voltage of said second source of voltage, and on either side of said median position the voltage impressed on said voltage responsive means is the full voltage of one of said sources of voltage due to its potential gradient dead spot, and a voltage less than the full voltage of the other of said sources of voltage as determined by the position of said mechanical means.

16. A control apparatus comprising: a first source of variable voltage, a second source of variable voltage, a first potentiometer having a first resistance element connected across said first source of voltage in a manner to cause a voltage of a first sense to appear across said first potentiometer resistance element, said first potentiometer also having a first movable tap cooperating with said first resistance element and having a dead spot wherein there is no relating potential gradient upon movement between said first potentiometer tap and resistance element, a second potentiometer having a second resistance element connected across said second source of voltage in a manner to cause a voltage of a sense opposite to said first sense to appear across said second potentiometer resistance element, said second potentiometer also having a second movable tap cooperating with said second resistance element and having a dead spot wherein there is no relative potential gradient upon movement between said second potentiometer tap and resistance element, control means having an input circuit, means connecting said input circuit to said first and second taps to apply a voltage of a first and an opposite sense thereto, means mechanically interconnecting said first and second taps relative to said first and second resistance elements so that when said taps are in a first position the entire voltages of said first and said second source of voltage are in opposing relationship and are applied to said input circuit, and when said taps move to either side of said first position a portion of the voltage of one of said sources is in opposition to the entire voltage of the other of said sources.

17. Control apparatus comprising: a first variable source of alternating voltage having a pair of output leads one of which has a voltage of a first phase thereon and the other of which has a voltage of the opposite phase thereon, a second variable source of alternating voltage having a pair of output leads one of which has a voltage of said first phase thereon and the other of which has a voltage of said opposite phase thereon; a first potentiometer having a resistance element, a low impedance bar connected to one end of said resistance element, and an adjustable tap movable over said resistance element and said low impedance bar; circuit means connecting said one lead of said first source to said resistance element and said other lead connected to said low impedance bar to apply a voltage of said opposite phase to the tap of said first potentiometer; a second potentiometer having a resistance element, a low impedance bar connected to one end of said resistance element, and an adjustable tap movable over said resistance element and said low impedance bar; circuit means connecting said one lead of said second source to said resistance element and said other lead connected to said low impedance bar of said second potentiometer to apply a voltage of said opposite phase to the tap of said second potentiometer; means mechanically connecting the taps of said first and second potentiometers to be moved as a unit such that when either wiper contacts the resistance element of its potentiometer the other wiper contacts the low impedance bar of its potentiometer; voltage phase responsive means connected to the taps of said first and second potentiometer, power means controlled by said voltage phase responsive means in accordance with the magnitude and phase of the voltage between said taps, and means connecting said power means to said taps to position said taps in accordance with the magnitude and phase of the voltage between said taps.

18. The combination comprising; a first source of voltage, a second source of voltage, a first potentiometer having a movable member biasing means urging said movable member in a first direction, a first resistance element having an input mounted on said movable member, an output consisting of a first movable wiper cooperating with said first resistance element to control the amount of input voltage on said first wiper and movable relative to said movable member, means mounted on said movable member adapted to coact with said first wiper to restrict the movement of said first wiper relative to said movable member after said first wiper moves a predetermined distance with respect to said first resistance element in a direction opposite said first direction so that there is no further potential gradient change; a second potentiometer having a fixed member, a second resistance element having an input mounted on said fixed member, an output consisting of a second movable wiper cooperating with said second resistance element to control the amount of input voltage on said second wiper, means mounted on said fixed member adapted to coact with said second wiper to restrict movement of said second wiper after said second wiper moves a predetermined distance in said first direction with respect to said second resistance element so that there is no further potential gradient change, means connecting said first voltage source to the input of said first resistance element and said second voltage source to the input of said second resistance element so that the voltage on said first wiper is of opposite sense to the voltage on said second wiper, voltage responsive means connected to said wipers, and mechanical means for transmitting movement of said movable member of said first potentiometer to said second wiper of said second potentiometer when said first wiper has completed its range of movement relative to said movable member so that in a median position the voltage on said voltage responsive means consists of the full voltage of said first source of voltage and the full voltage of said second source of voltage, and on either side of said median position the voltage on said voltage responsive means consists of the full voltage of one of said sources of voltage due to the wiper being restricted in movement, and a voltage less than full voltage of the other of said sources as determined by the said mechanical means.

References Cited in the file of this patent
UNITED STATES PATENTS

| | | |
|---|---|---|
| 2,323,128 | Hare | June 29, 1943 |
| 2,471,393 | Calwell et al. | May 24, 1949 |
| 2,522,976 | Williams | Sept. 19, 1950 |
| 2,573,122 | Weber | Oct. 30, 1951 |
| 2,678,422 | Broomell, et al. | May 11, 1954 |
| 2,696,119 | Jones | Dec. 7, 1954 |
| 2,696,120 | Underwood | Dec. 7, 1954 |

FOREIGN PATENTS

| | | |
|---|---|---|
| 679,393 | Germany | Aug. 4, 1939 |